(12) United States Patent
Daugherty

(10) Patent No.: US 11,712,937 B1
(45) Date of Patent: Aug. 1, 2023

(54) HOSE LINE MANAGEMENT SYSTEM FOR A TRACTOR-TRAILER

(71) Applicant: Jerry Daugherty, Spring, TX (US)

(72) Inventor: Jerry Daugherty, Spring, TX (US)

( * ) Notice: Subject to any disclaimer, the term of this patent is extended or adjusted under 35 U.S.C. 154(b) by 200 days.

(21) Appl. No.: 17/209,106

(22) Filed: Mar. 22, 2021

Related U.S. Application Data

(60) Provisional application No. 62/992,304, filed on Mar. 20, 2020.

(51) Int. Cl.
*B60D 1/62* (2006.01)

(52) U.S. Cl.
CPC ...................................... *B60D 1/62* (2013.01)

(58) Field of Classification Search
CPC .... B60D 1/58; B60D 1/62; B60D 1/64; B60R 11/00; B60R 16/02; B60R 16/0207; B60R 16/0215
See application file for complete search history.

(56) References Cited

U.S. PATENT DOCUMENTS

| | | | | |
|---|---|---|---|---|
| 2,525,086 A * | 10/1950 | Wright | ...................... | B60D 1/62 439/35 |
| 3,279,823 A * | 10/1966 | Thouvenelle | ............ | B60D 1/62 280/421 |
| 3,901,270 A * | 8/1975 | Smith | ...................... | B60D 1/62 248/75 |
| 4,092,034 A * | 5/1978 | Becker | ................... | B62D 53/00 439/36 |
| 4,111,452 A * | 9/1978 | Carlsson | ............. | B66F 9/07504 280/421 |
| 4,487,218 A * | 12/1984 | Sifri | ....................... | B65H 75/38 242/379.2 |
| 4,658,854 A * | 4/1987 | Hopkins | ................. | F16L 3/223 280/421 |
| 5,108,253 A * | 4/1992 | Kobayashi | ............ | E02F 9/2271 414/694 |
| 5,535,511 A * | 7/1996 | Karasik | .................. | H02B 1/202 29/33 M |
| 6,651,940 B2 * | 11/2003 | Hill, Sr. | .................... | F16L 3/16 248/80 |
| 8,840,128 B2 * | 9/2014 | Glazner | ................. | B60D 1/015 280/422 |
| 9,382,685 B2 * | 7/2016 | Maki | ......................... | E02F 9/14 |
| 10,068,682 B2 * | 9/2018 | Itani | ..................... | B60R 16/0215 |
| 10,153,630 B2 * | 12/2018 | Yanazawa | ............ | H02G 15/043 |
| 10,195,915 B2 * | 2/2019 | Browne | ................. | B60D 5/006 |
| 10,238,019 B2 * | 3/2019 | Ito | ......................... | H02G 3/0468 |
| 2002/0050698 A1 * | 5/2002 | Dippenaar | ............... | B60D 1/62 280/422 |
| 2019/0135202 A1 * | 5/2019 | Korson | ................. | F16B 5/0266 |

* cited by examiner

*Primary Examiner* — Kevin Hurley
*Assistant Examiner* — Maurice L Williams
(74) *Attorney, Agent, or Firm* — Kenneth L. Tolar

(57) ABSTRACT

A hose line management system for a tractor-trailer includes a vertical tube rotatably mounted on the truck frame, between the cab and trailer, and a horizontal tube pivotally attached to the upper end of the vertical tube. The truck's electrical cables and air hoses are passed through the tubes and connected to the trailer. The tubes can move in both a vertical and horizontal plane according to vehicle movement to prevent the hoses from breaking or disconnecting. The tubes are biased to return to an original position when no longer stressed by vehicle movement or orientation.

8 Claims, 7 Drawing Sheets

US 11,712,937 B1

HOSE LINE MANAGEMENT SYSTEM FOR A TRACTOR-TRAILER

CROSS REFERENCE TO RELATED APPLICATIONS

This application claims priority of provisional application No. 62/992,304 filed on Mar. 20, 2020, the specification of which is incorporated herein by reference.

BACKGROUND OF THE INVENTION

The present invention relates to a device for protecting air hoses and power cables on tractor-trailers.

DESCRIPTION OF THE PRIOR ART

A tractor-trailer includes hoses and electrical cables that are coupled with connectors on the back wall of the cab and front wall of the trailer for transmitting operational power and air to the trailer. Not only must they have sufficient length to reach the trailer, they must also contain enough slack to allow normal trailer movement without breaking or disconnecting the hoses. The excess slack often engages the truck's frame, decking and other surfaces, which abrades the outer casing and prematurely damages the cables. Replacing costly cables and hoses is burdensome and expensive. Furthermore, damaging the cables during vehicle operation can be hazardous. For example, damage to the airbrake hose can cause sudden brake failure, placing the truck driver and nearby vehicles at substantial risk of injury or death.

Some trucks are equipped with springs or spring-biased hoses to minimize excess slack or sagging. However, the biasing springs also abrade the hoses and do not effectively prevent entanglement.

Accordingly, there is currently a need for a hose management system for a tractor-trailer that prevents tangling, sagging and excessive wear. The present invention addresses this need by providing a hose line management system including a vertical tube and a horizontal tube that house and protect the cables. The tubes can move in both a vertical and horizontal plane according to vehicle movement to prevent the hoses from breaking or disconnecting. The tubes are biased to return to an original position when no longer stressed by vehicle movement.

SUMMARY OF THE INVENTION

The present invention relates to a hose line management system for a tractor-trailer including a vertical tube rotatably mounted on the truck frame, between the cab and trailer, and a horizontal tube pivotally attached to the upper end of the vertical tube. The truck's electrical cables and air hoses are passed through the tubes and connected to the trailer. The tubes can move in both a vertical and horizontal plane according to vehicle movement to prevent the hoses from breaking or disconnecting. The tubes are biased to return to an original position when no longer stressed by vehicle movement or orientation.

It is therefore an object of the present invention to provide a hose management system for a tractor trailer.

It is therefore another object of the present invention to provide a hose management system that prevents excess hose slack from contacting external surfaces.

It is yet another object of the present invention to provide a hose management system that prolongs the useful life of a truck's air hoses and electrical cables.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
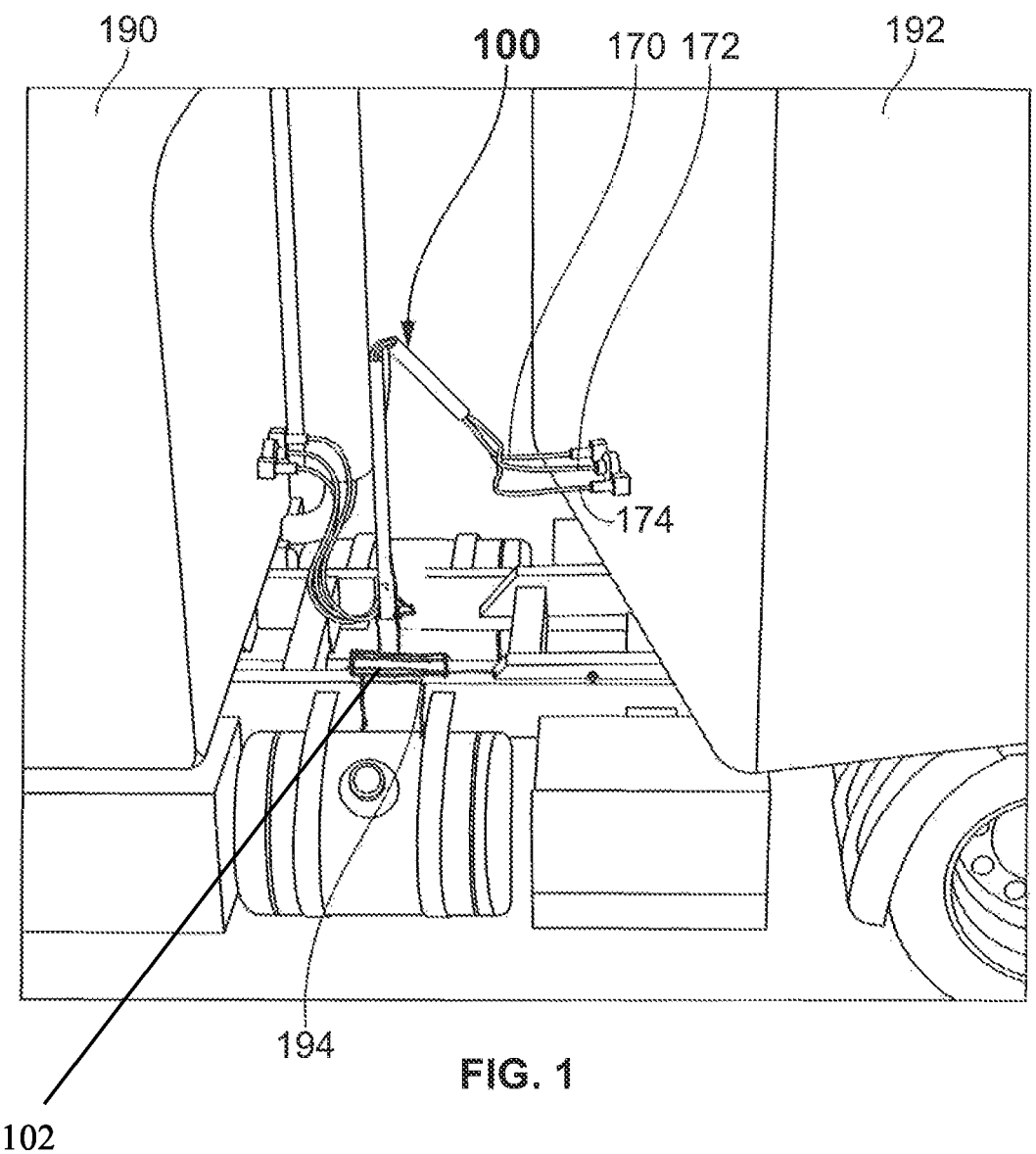
FIG. 1 depicts the hose line handler according to the present invention mounted on a truck frame.
Figure 2:
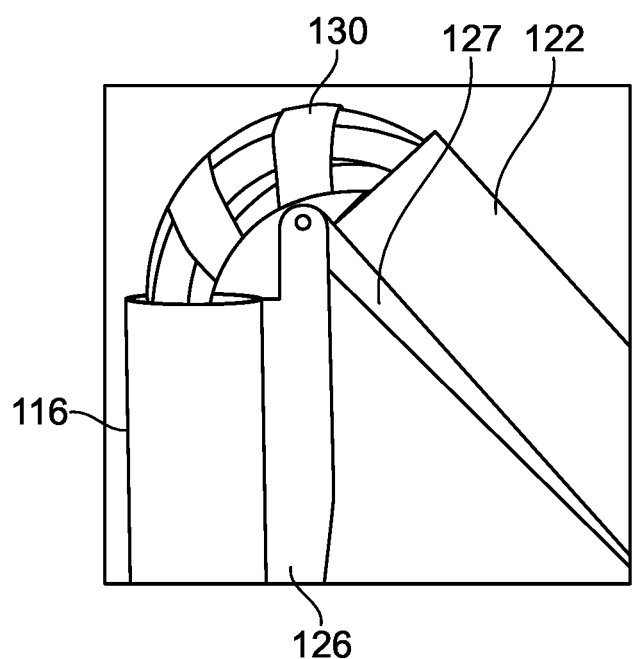
FIG. 2 depicts the pivot mechanism coupling the vertical and horizontal tubes.
Figure 3:
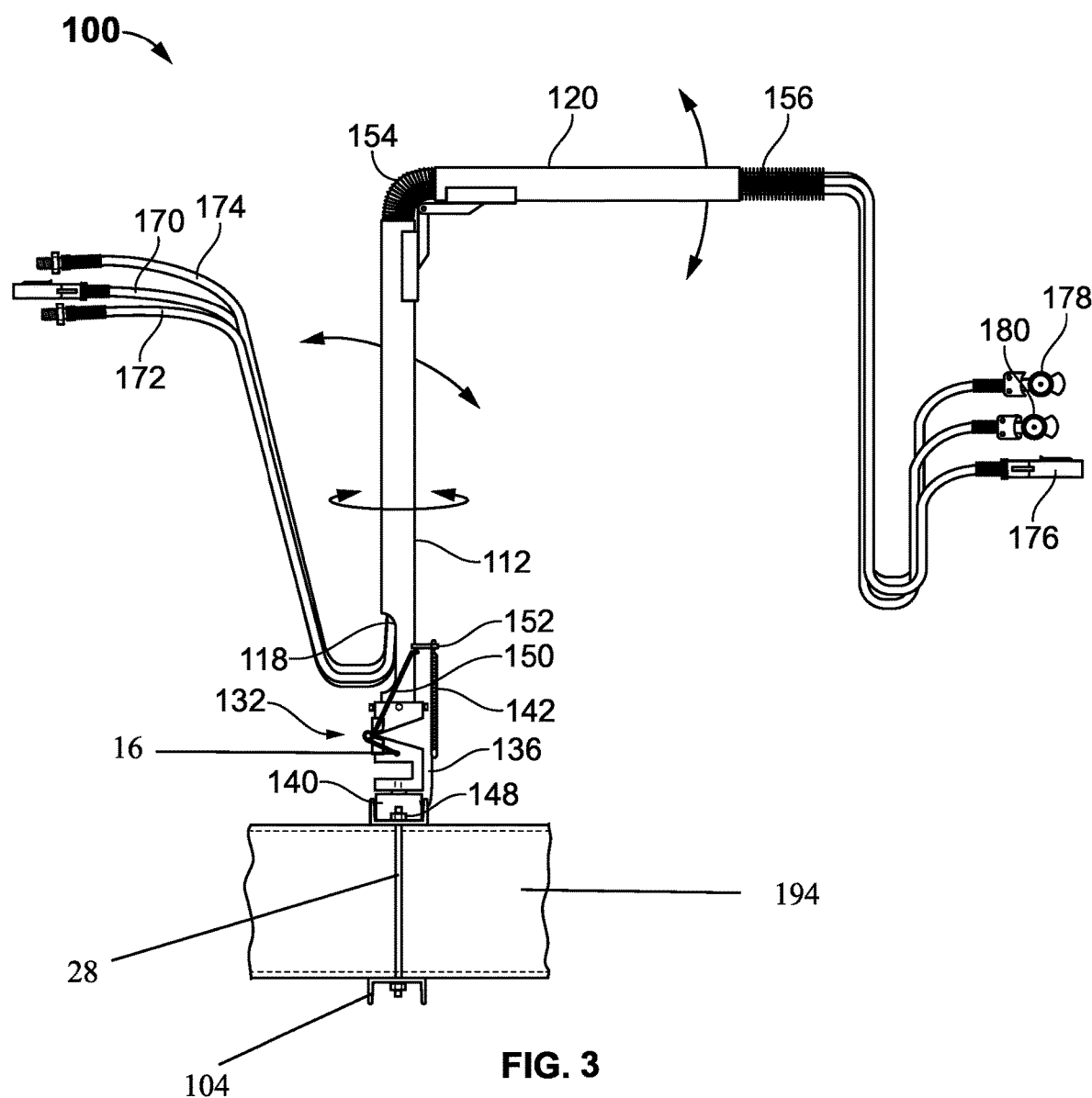
FIG. 3 is an isolated, plan view of the hose line handler mounted to the truck frame.
Figure 4:
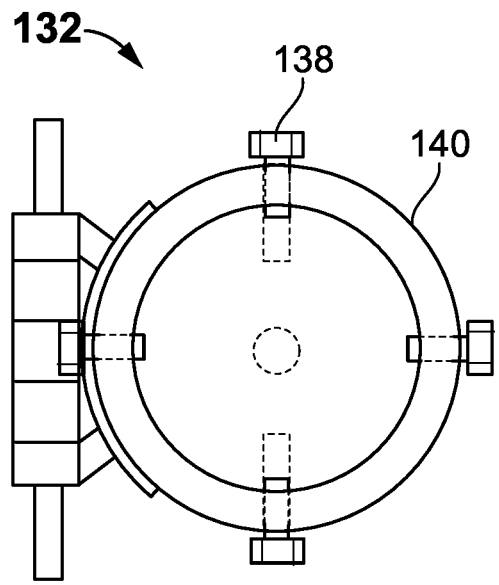
FIG. 4 is a top view of the tilt connector.
Figure 5:
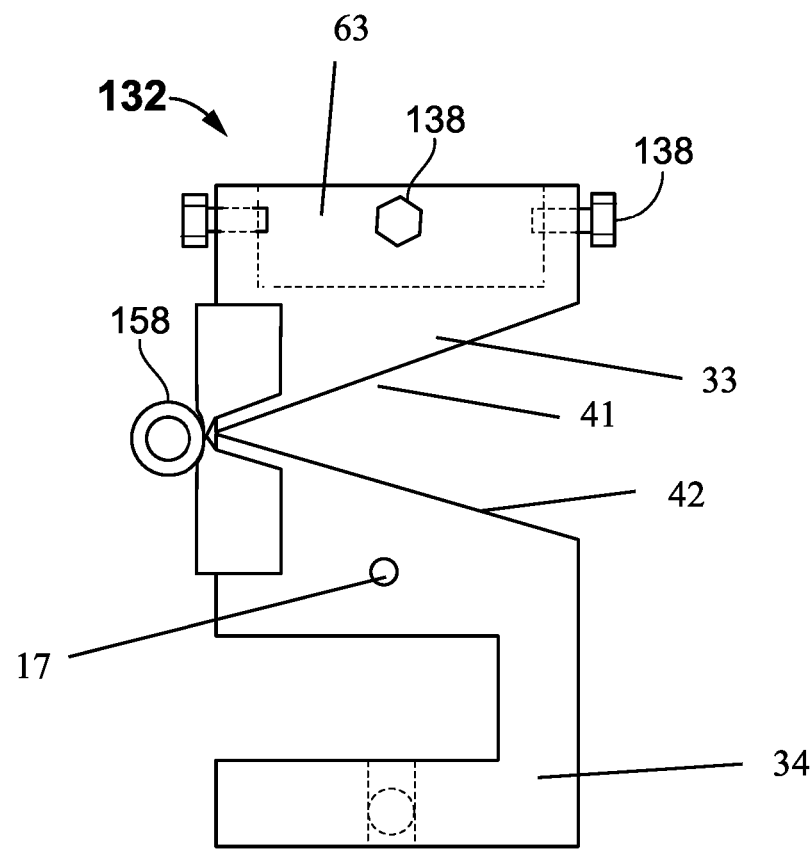
FIG. 5 is a side view of the tilt connector.
Figure 6:
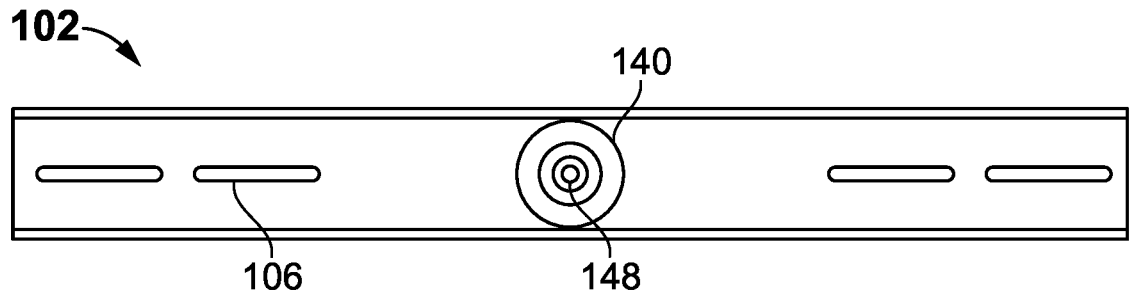
FIG. 6 is a top view of the upper channel.
Figure 7:
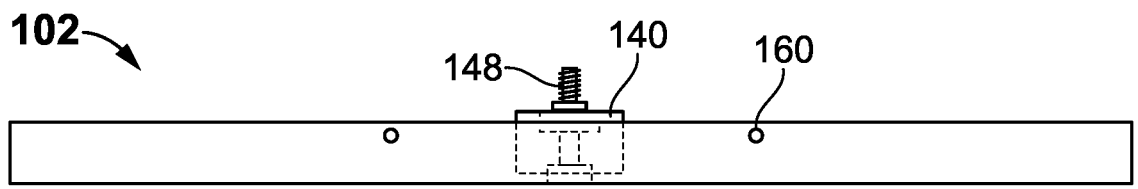
FIG. 7 is a side view of the upper channel.
Figure 8:
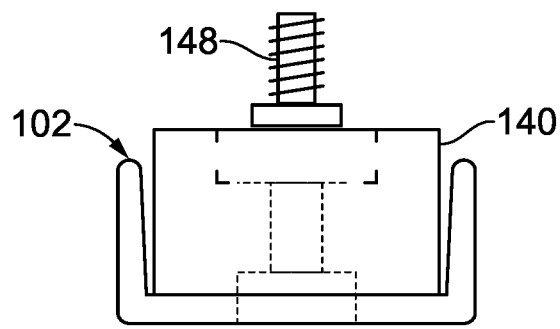
FIG. 8 is an end view of the upper channel.
Figure 9:
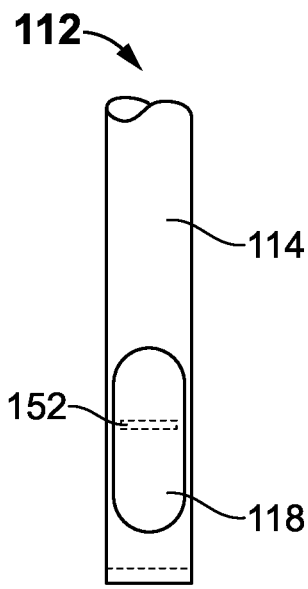
FIG. 9 is a front, lower-sectional view of the vertical tube.
Figure 10:
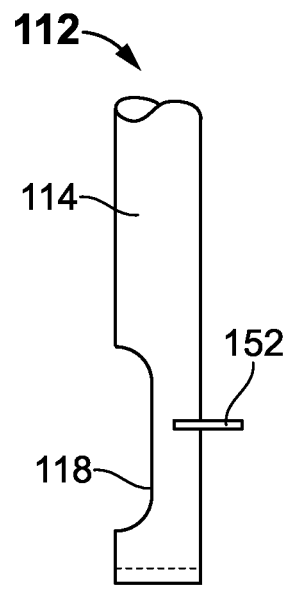
FIG. 10 is a side, lower-sectional view of the vertical tube.
Figure 11:
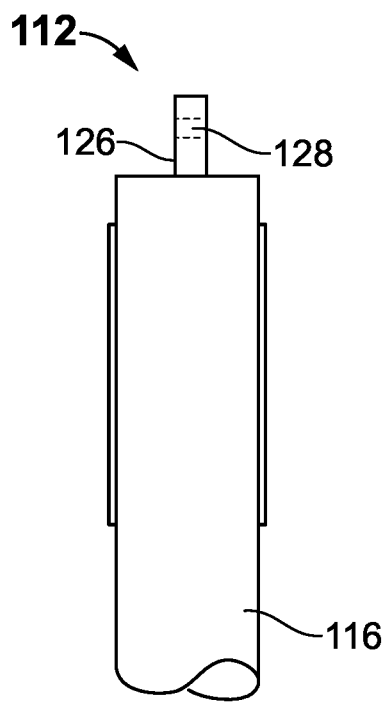
FIG. 11 is a front, upper-sectional view of the vertical tube.
Figure 12:
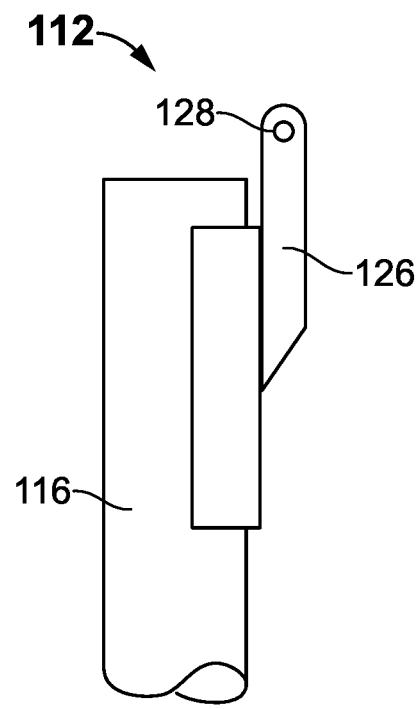
FIG. 12 is a side, upper-sectional view of the vertical tube.
Figure 13:
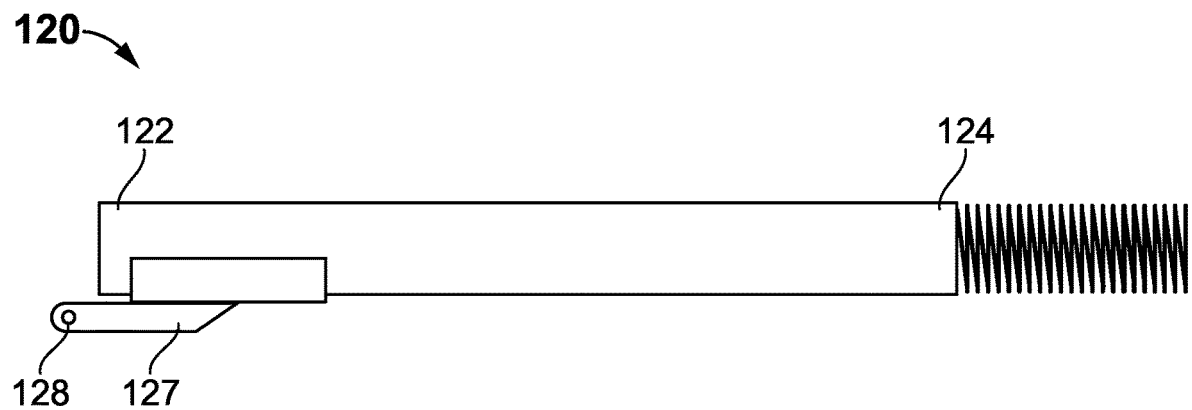
FIG. 13 is a side view of the horizontal tube.
Figure 14:
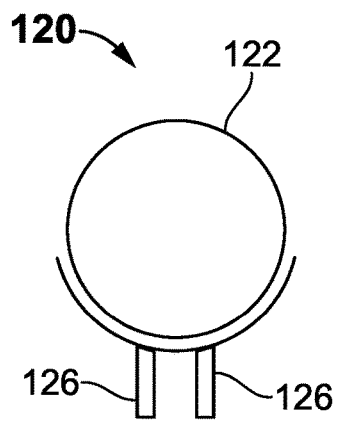
FIG. 14 is an end view of the horizontal tube.

A typical semi-truck or tractor-trailer includes a cab or tractor 190 that is connected to a trailer 192 via a frame 194. The truck incudes a plurality of airbrake hoses 172, 174 and electrical cables 170 that are connected to ports on the cab rear wall for transmitting operational power and air to the trailer. The hoses and cable include gladhands 178, 180 and locking connectors 176 at their distal ends that are coupled with mating ports on the trailer. The hoses and cables could be color-coded for easier identification, i.e., the electrical cable could be green, the emergency brake hose could be red, and the service brake hose could be blue.

The present invention relates to a handler 100 for a tractor trailer as described above that is designed to prevent the hoses 172, 174 and electrical cable 170 from tangling, sagging, or becoming prematurely worn during routine operation. Any reference herein to either "cables" or "hoses" also means the other or any other similar cord extending from the cab to the trailer. The handler 100 includes a base support frame formed of an upper channel 102 having a central, rotatable support hub 140 with a sealed bearing that freely rotates in either direction. The upper channel 102 further includes a plurality of slots 106 that receive fasteners 148 to secure the channel to the truck frame 194. A lower channel 104 without a rotating hub is fastened to the underside of the frame 194, and fasteners 28 are secured to both channels to secure the support frame in a parallel orientation relative to the trailer.

The upper channel 102 supports a vertical tube 112 having a lower section 114 and an upper section 116. The lower section 114 includes an opening 118 for receiving the cable 170 and hoses 172, 174 from the cab prior to connection with the trailer. The opening 118 is defined by chamfered edges to prevent abrading of the cables. The vertical tube 112 is hingedly connected to the upper channel via a tilt connector 132 mounted on the rotatable support hub 140. The tilt connector 132 includes an upper section 33 and a lower section 34 that are pivotally joined with a hinge 158.

The upper section 33 includes an angled bottom wall 41 that meshes with an angled top wall 42 on the lower section 34 to limit downward movement of the upper section to approximately 45 degrees from a vertical plane.

The upper section includes a cylindrical cavity 63 for receiving the lower section 114 of the vertical tube 112. The tube is anchored in the cavity with a plurality of peripherally positioned fasteners 138. The tilt connector 132 further includes a double torsional spring 150 having a pair of coiled portions that receive an extended portion of the hinge 158 pin. Free ends 16 of the spring are received within apertures 17 on the tilt connector lower section while an intermediate portion is secured to the vertical tube 112. The torsional spring biases the vertical tube in an upright position while allowing downward movement according to cab and trailer motion. One or more vertical springs 142 are secured to a plate 152 at one end and to holes 160 on the upper channel 102 at another end. The vertical springs 142 return the vertical tube to face an original direction after rotating on the central support hub according to vehicle and cab movement.

Pivotally connected to the upper section 116 of the vertical tube is a horizontal tube 120 having a proximal end 122 and a distal end 124. A hinge support 126 on the upper section of the vertical tube mates with a hinge plate 127 on the proximal end 122 of the horizontal tube 120. The hinge mechanism allows the horizontal tube to pivot upwardly and downwardly according to trailer and cab movement while protecting the enclosed hoses and cable from damage. A spring 154 keeps the tube 120 in a horizontal position while supporting, guiding, and protecting the cables and hoses as they transition from a vertical orientation to a horizontal orientation. A spring 156 at the distal end 124 of the horizontal tube prevents the hoses from kinking and contorting as they exit the tube 120. Preferably, the horizontal tube, the vertical tube, and the springs 154, 156 each include a plastic liner to provide a smooth surface on which the hoses and cable slide to prevent abrasion to the external casing. Furthermore, the hoses and cable can be bundled with one or more bands 130 to facilitate insertion into the tubes.

Accordingly, the channels are secured to the vehicle frame 194 and the vertical post is mounted within the tilt-connector cavity. The hoses are fed through the vertical and horizontal tubes and connected to the trailer. The rotating hub allows the protected hoses to move laterally according to the relative angle between the cab and trailer. The hinged tilt connector allows the hoses to move vertically according to vehicle movement while the torsional and linear springs return the tubes to an upright position that is parallel to the truck cab.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a semi-truck having a cab connected to a trailer with a frame therebetween, and a plurality of cables connected to said cab for transmitting operational power and air to said trailer, a hose management system comprising:
   a vertical tube rotatably mounted on said frame, said vertical tube having an upper section, an upper end, a lower section and a lower end, said vertical tube receiving a first portion of said cables;
   means for pivoting said upper section onto said lower section, wherein said means for pivoting said upper section onto said lower section comprises a tilt connector including an upper section pivotally connected to a lower section, said lower section attached to said frame and said upper section attached to the lower end of said vertical tube;
   a horizontal tube having a proximal end and a distal end, said proximal end pivotally connected to the upper end of said vertical tube; said horizontal tube receiving a second portion of said cables whereby said vertical tube and said horizontal tube are rotatable in a horizontal plane and pivotal in a vertical plane according to cab and trailer movement.

2. The hose management system according to claim 1 further comprising a means for biasing said horizontal tube in a direction that is parallel to said cab.

3. The hose management system according to claim 2 wherein said means for biasing said horizontal tube in a direction that is parallel to said cab comprises a spring secured to a plate on said vertical tube and to the upper channel.

4. The hose management system according to claim 1 further comprising a means for biasing said vertical tube in an upright position.

5. The hose management system according to claim 4 wherein said means for biasing said vertical tube in an upright position comprises a torsional spring attached to the lower section of said tilt connector and said vertical tube.

6. The hose management system according to claim 1 wherein the upper section of said tilt connector includes an angled bottom wall that meshes with an angled top wall on the lower section of said tilt connector to limit downward movement of the upper section of said vertical tube.

7. The hose management system according to claim 1 further comprising a first spring on the proximal end of said horizontal tube and receiving said cables, said first spring biasing the horizontal tube in a horizontal position and supporting, guiding, and protecting said cables.

8. The hose management system according to claim 7 further comprising a second spring at the distal end of the horizontal tube to prevent said cables from kinking and contorting when exiting the horizontal tube.

* * * * *